UNITED STATES PATENT OFFICE.

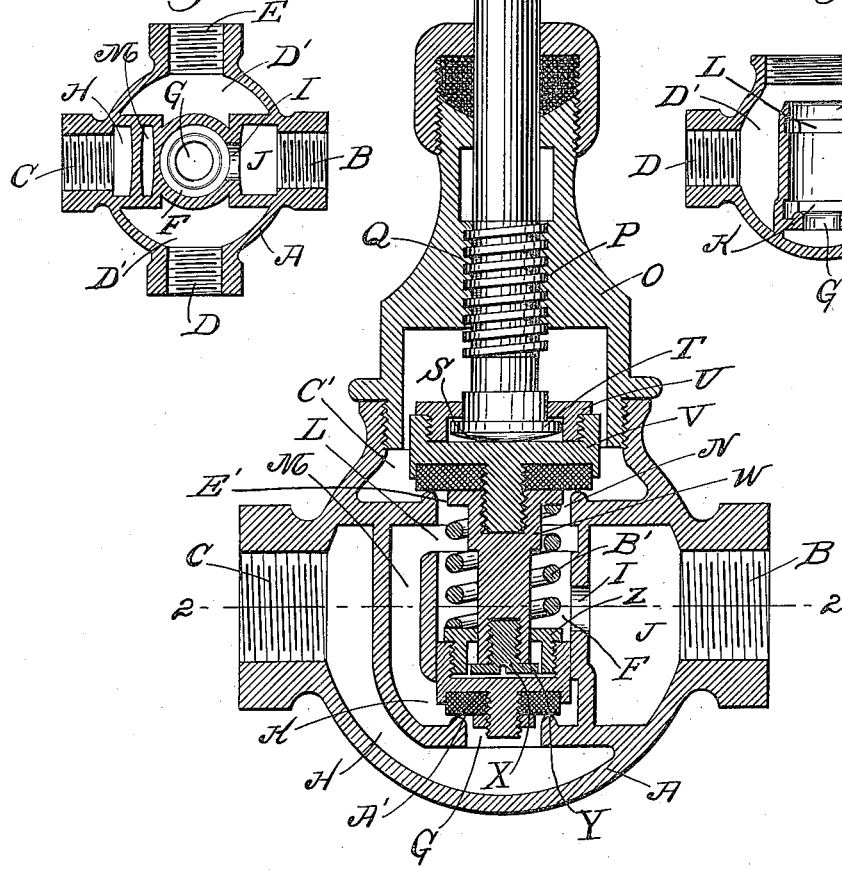

IRVING W. WHITE, OF NEW YORK, N. Y.; WILLARD H. WHITE, OF NEW HAVEN, CONNECTICUT, ADMINISTRATOR OF SAID IRVING W. WHITE, DECEASED.

TEMPERATURE-CONTROLLING VALVE.

949,869.

Specification of Letters Patent. Patented Feb. 22, 1910.

Application filed March 20, 1907. Serial No. 363,441.

*To all whom it may concern:*

Be it known that I, IRVING W. WHITE, of the city, county, and State of New York, have invented new and useful Improvements in Temperature-Controlling Valves, of which the following is a full, clear, and exact description, when taken in connection with the accompanying drawings.

This invention relates to temperature controlling valves, and more particularly to that class of valves in which by means of a single valve stem a plurality of valves are operated so that from the valve may be drawn either hot or cold water alone, or hot and cold water mixed in any desired proportions.

To this end, the invention consists of a mixing chamber with separate inlets from the cold and hot water supplies, together with two valves, one controlling the outlet from the mixing chamber, and the other the inlet to said chamber from the hot water supply; the two valves having a sliding connection with each other and a spring tending to hold them apart, together with other improvements and combinations of parts set forth and claimed hereinafter.

Referring to the drawings, Figure 1 represents a vertical central section through a valve embodying the invention, Fig. 2, a horizontal section on line 2—2 of Fig. 1, and Fig. 3, a transverse central vertical section through the lower portion of the casing.

In all figures, similar letters of reference represent like parts.

In the drawings, the part designated by the letter A represents a substantially spherical or bulbous casing, having four lateral openings, B, C, D and E. The openings B and C are adapted to be used as inlets for the cold and hot water supplies, respectively, while the openings D and E are intended to be used as the outlets from the casing A.

Within the casing A is a mixing chamber F, having at its bottom a perforation G, communicating by means of the passage H with the hot water inlet C, and adapted to form a valve seat. At one side of the chamber F is a perforation I communicating by means of the chamber J with the cold water inlet B. On the opposite side of the mixing chamber F from the perforation I are two ports or openings K and L, communicating with the passage way M. The upper end of the mixing chamber F is open and adapted to form a valve seat N.

The spherical casing A is adapted to be screwed on to a supplementary casing O, which is provided with an axial bore screw threaded at P for the screw threaded portion Q of the valve stem R. The valve stem R is slightly convex at its lower end, as shown at S, and is provided with an annular flange T adapted to engage a plate U loosely mounted on the stem. The plate U has a screw connection with a valve V adapted to come in contact with the valve seat N of the mixing chamber F.

To the lower end of the valve V is screwed a depending extension W adapted to project downward into the mixing chamber F, and a plate Z is loosely mounted on the extension W, and is held thereon by the flanged head Y of a screw X screwed to the end of the extension. The plate Z has a screw connection with a valve A′ adapted to come in contact with and close the perforation or valve seat G at the lower end of the mixing chamber F. The plate Z and valve A′ are capable of a limited movement on the extension W, as appears in Fig. 1. The screw connection of valve A′ is of such diameter as to extend across from wall to wall of the mixing chamber F, so that when it is raised it will close the inlet port I (for the cold water), which is located in the wall of the mixing chamber. When the valve A′ is seated it closes the perforation G through which the hot water enters. As it is raised from its seat it admits the hot water through the perforation so that it will flow into the by-pass H, when it will pass through the passage M into the upper part of the mixing chamber, as it cannot pass the valve A′ and connection directly into the lower part of the mixing chamber F.

B′ is a coiled spring surrounding the extension W and adapted to bear on the under side of the flange E′ on the extension W, and the upper side of the plate Z, tending to hold these members and their associated parts away from each other.

The operation of the device is as follows: The cold water enters through the inlet B, chamber J and perforation I the mixing chamber F. As the valve stem R is rotated, the valve V will be raised by the flange T from its seat N, and the cold water may flow out through the opening N into the chamber C', and thence through passages D', out of the ports D and E. The spring B' by its pressure on the plate Z tends to retain the valve A' on its seat G, to prevent the entrance of hot water into the mixing chamber F, until the valve V and the extension W and screw X are raised so far that the flange Y of the screw head comes in contact with the plate Z to raise the valve A' from its seat. When the valve A' is raised, the hot water coming from the inlet C and the passage H may pass through the perforation G, under the valve A' through the lateral port K, passage-way M and port L into the mixing chamber F where it will mix with the cold water and flow outward through the opening N. If the valve stem is further raised the valve A' comes opposite to the lateral perforation I in the mixing chamber F and gradually closes it, thus preventing the entrance of the cold water from the chamber J into the mixing chamber F. By this construction, when the stem is first turned, cold water is permitted to flow through the valve. As it is turned further, the hot water is permitted to mix with the cold and finally upon the further turning of the valve stem the cold water is shut off and hot water alone flows through the valve. Upon the reverse movement, the two valves V and A' are forced downward simultaneously because the spring B' tends to hold them apart. When, however, the valve A' reaches the valve seat G, the valve V is still raised from its valve seat, so that the hot water is shut off before the cold water is. Further downward movement of the valve stem forces the valve V home on its seat, and stops the entire flow of the water through the valve, and restores the parts to their normal position, shown in Fig. 1. By means of the convex end S of the stem, the valve V is seated squarely on its seat, and is held there by the spring B' against rattling because as soon as the valve A' is seated the spring B' tends to press the valve V upward against the convex end S of the stem and the further downward movement of the stem presses the valve V downward against the tension of the spring B' positively onto its seat. Furthermore, when the valve A' is seated, the cold water which is admitted to the mixing chamber F will tend to hold the valve A' on its seat. When it is desired to remove the valves and associated parts, it is only necessary to unscrew the part O of the casing from the part A, when the stem R, valves V and A', and spring B' may be removed as a unitary structure, because the opening in the casing A is wider than the valves and the opening N is wider than the valve A'.

The device above described, in which a single spindle or valve stem controls both the hot and cold water supplies, may take the place of separate hot and cold water valves, and is adapted for use in plumbing fixtures of all characters, such as lavatories, faucets, slop sinks, and bathing apparatus wherein hot and cold water are used together. Its construction is such that by the first full turn of the handle or valve stem, absolute cold water is drawn, thus avoiding any chance of scalding the person using the valve. Furthermore, the present invention is provided with two independent compression positive shut-off valves, which obviates any liability of the hot and cold water circulating throughout the system.

By means of the screw connection between the extension W and valve V, and the valve A' and plate Z the extent of movement of the valve A' on the stem may be adjusted to make a nice fit.

Having now described my invention, what I claim and desire to secure by Letters Patent, is:—

1. In a valve, the combination with the casing; of a mixing chamber with an outlet and a plurality of inlets; two valve members, one of which is adapted to control said outlet and the other to close one or the other inlet; a yielding connection between said valve members, whereby the outlet controlling valve member may be unseated without movement of said inlets controlling valve member, substantially as described.

2. In a valve, the combination with the casing; of a mixing chamber with an outlet and a plurality of inlets, two valve members controlling respectively the inlets and outlet; a valve stem having a positive connection with said outlet controlling valve member and a limited sliding connection with said inlets controlling valve member, whereby upon the movement of said valve stem said outlet controlling valve member may be actuated without movement of said inlets controlling valve member, substantially as described.

3. In a valve, the combination with the casing; of a mixing chamber with an outlet and a plurality of inlets; two valve members, one of which is adapted to control said outlet and the other to close one or the other inlet, according as it is in one position or the other, one of said inlets being above its valve member; and a by pass communicating from the other inlet to said mixing chamber above said inlets controlling valve member, substantially as described.

4. In a valve, the combination with the casing; of a mixing chamber with a plurality of water inlets and an outlet, one of said inlets being located in the bottom and one on the side; two valve members, one of which is adapted to close said inlets as it is in one or the other of its extreme positions, the other valve member controlling the outlet; and a valve stem having a sliding connection with said inlet closing valve, substantially as described.

5. In a valve, the combination with the casing; of a mixing chamber with an inlet and outlet; two valve members adapted to control said inlet and outlet, respectively; a sliding connection between said valve members, whereby one may be actuated a limited distance without movement of the other; and means for adjusting the limit of such independent movement, substantially as described.

In witness whereof I have hereunto set my hand on the 16th day of March, 1907.

IRVING W. WHITE.

Witnesses:
 RICHARD W. MILLER,
 FLORANCE J. MILLER.